(12) United States Patent
Fröjdh et al.

(10) Patent No.: US 6,859,500 B2
(45) Date of Patent: Feb. 22, 2005

(54) RUN-LENGTH CODING OF NON-CODED MACROBLOCKS

(75) Inventors: Per Fröjdh, Stockholm (SE); Rickard Sjöberg, Tumba (SE); Torbjörm Einarsson, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 598 days.

(21) Appl. No.: 10/066,027

(22) Filed: Jan. 30, 2002

(65) Prior Publication Data

US 2002/0136306 A1 Sep. 26, 2002

Related U.S. Application Data

(60) Provisional application No. 60/277,515, filed on Mar. 20, 2001.

(51) Int. Cl.[7] .................................................. H04N 7/12
(52) U.S. Cl. .............................. 375/240.27; 375/240.23
(58) Field of Search ........................ 375/240.23, 240.27; 348/425.1, 425.2, 425.3; 382/232–233, 244, 251, 253; 341/59, 61, 65, 67; 714/746

(56) References Cited

U.S. PATENT DOCUMENTS

| 5,903,313 | A | | 5/1999 | Tucker et al. ................ 348/416 |
|---|---|---|---|---|
| 6,055,272 | A | * | 4/2000 | Kim ....................... 375/240.23 |
| 6,690,881 | B1 | * | 2/2004 | Tomita et al. ............... 386/117 |
| 6,801,668 | B2 | * | 10/2004 | Frojdh et al. ................ 382/246 |
| 2002/0085021 | A1 | * | 7/2002 | Sullivan et al. ............. 345/716 |
| 2002/0114397 | A1 | * | 8/2002 | Todo et al. ............. 375/240.29 |
| 2002/0118953 | A1 | * | 8/2002 | Kim ............................. 386/70 |
| 2003/0095597 | A1 | * | 5/2003 | Talluri et al. .......... 375/240.08 |

OTHER PUBLICATIONS

Redmill et al, "The EREC: An Error–Resilient Technique for Coding Variable Length Blocks of Data", IEEE Transactions On Image Processing, vol. 5, No. 4, pp. 565–574, Apr. 1996.*

The ITU Telecommunication Standardization Sector (ITU–T), "Video Codec for Audiovisual Services At p × 64 kbit/s", Line Transmission of Non–Telephone Signals, Mar. 1993, pp. 1–25.

The ITU Telecommunication Standardization Sector (ITU–T), "Information Technology–Generic Coding of Moving Pictures and Associated Audio Information: Video", Series H: Audiovisual and Multimedia Systems, Feb. 2000, pp. 1–206.

* cited by examiner

*Primary Examiner*—Vu Le

(57) ABSTRACT

A method of video data compression is provided which is comparatively efficient in compressing data, and at the same time enables transmission of compressed data with sufficient robustness to withstand losses in the transmission channel. A frame of data is divided into coded macroblocks and skipped macroblocks which are grouped into respective slices in a sequence of slices. Respective slices are allowed to contain arbitrary numbers of consecutive macroblocks, and can begin and end at arbitrary positions within the frame. A run-length codeword, comprising a small number of bits, is inserted at the end of a slice to indicate the total number of skipped macroblocks between the final coded macroblock and the end of the slice. To further enhance error resilience an additional codeword, which also indicates the total number of skipped macroblocks, may be inserted at the beginning of the next-following slice.

11 Claims, 3 Drawing Sheets

| Address | Codeword | Address | Codeword |
|---|---|---|---|
| 1 | 1 | 17 | 0000 0101 10 |
| 2 | 011 | 18 | 0000 0101 01 |
| 3 | 010 | 19 | 0000 0101 00 |
| 4 | 0011 | 20 | 0000 0100 11 |
| 5 | 0010 | 21 | 0000 0100 10 |
| 6 | 00011 | 22 | 0000 0100 011 |
| 7 | 00010 | 23 | 0000 0100 010 |
| 8 | 0000 111 | 24 | 0000 0100 001 |
| 9 | 0000 110 | 25 | 0000 0100 000 |
| 10 | 0000 1011 | 26 | 0000 0011 111 |
| 11 | 0000 1010 | 27 | 0000 0011 110 |
| 12 | 0000 1001 | 28 | 0000 0011 101 |
| 13 | 0000 1000 | 29 | 0000 0011 100 |
| 14 | 0000 0111 | 30 | 0000 0011 011 |
| 15 | 0000 0110 | 31 | 0000 0011 010 |
| 16 | 0000 0101 11 | 32 | 0000 0011 001 |
|  |  | 33 | 0000 0011 000 |

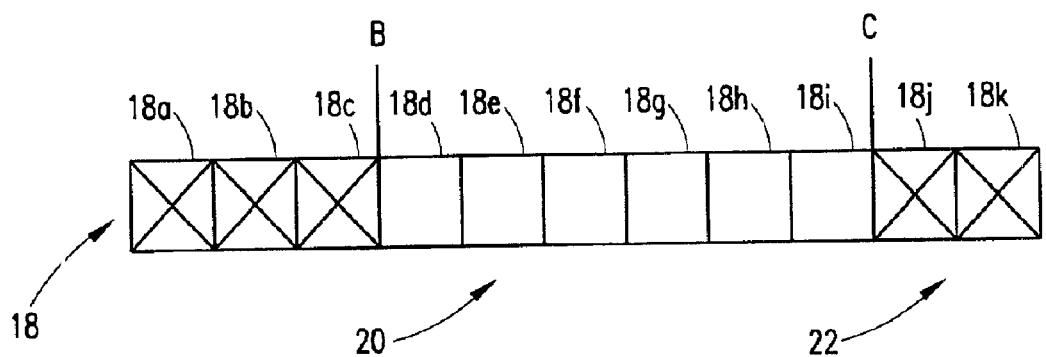
FIG. 3
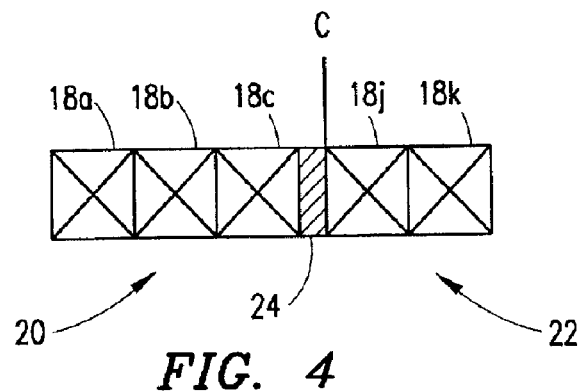
FIG. 4
| Index | SKIPRUN | Codeword |
|---|---|---|
| 0 | 0 | 1 |
| 1 | 1 | 001 |
| 2 | 2 | 011 |
| 3 | 3 | 00001 |
| 4 | 4 | 00011 |
| 5 | 5 | 01001 |
| 6 | 6 | 01011 |
| 7 | 7 | 0000001 |
| 8 | 8 | 0000011 |
| 9 | 9 | 0001001 |
FIG. 5

RUN-LENGTH CODING OF NON-CODED MACROBLOCKS

CROSS REFERENCE TO RELATED APPLICATION

This application for patent claims the benefit of priority from, and hereby incorporates by reference the entire disclosure of, co-pending U.S. provisional application for patent Ser. No. 60/277,515, filed Mar. 20, 2001.

BACKGROUND OF THE INVENTION

The invention disclosed and claimed herein generally pertains to a method for compression of video signal data. More particularly, the invention pertains to a method of the above type wherein the video data is collectively represented by arrays of coded macroblocks and skipped (or non-coded) macroblocks. Even more particularly, the invention pertains to a method of the above type wherein macroblocks are grouped into slices, and run-length coding is used to indicate the number of skipped macroblocks therein.

Digital video signals, in non-compressed form, typically contain large amounts of data. However, the actual necessary information content is considerably smaller due to high temporal and spatial correlations. Accordingly, video compression, or coding, is used to reduce the amount of data which is actually required for certain tasks, such as storage of the video signals or for transmitting them from one location to another. In the coding process temporal redundancy can be used by making so-called motion-compensated predictions, where regions of a video frame are predicted from similar regions of a previous frame. That is, there may be parts of a frame that do not contain any, or hardly any, change at all from corresponding parts of the previous frame. Such regions can thus be skipped or non-coded, in order to maximize compression efficiency. On the other hand, if a good match with a previous frame cannot be found, predictions within a frame can be used to reduce spatial redundancy. With a successful prediction scheme, the prediction error will be small and the amount of information that has to be coded greatly reduced. Moreover, by transforming pixels to a frequency domain, e.g., by using the discrete cosine transform, spatial correlations provide further gains in efficiency. Prior art techniques of video compression are described, for example, in U.S. Pat. No. 5,903,313, issued May 11, 1999.

Notwithstanding the benefits of video data compression, the coded bitstream, i.e., compressed data which is transmitted from one location to another, may become corrupted due to error-prone transmission channels. If this happens, relying too much on prediction may cause large potential damage such as propagating errors and severely decreasing video quality. In the past, common techniques of reducing such damage have included preventing temporal predictions at certain times, and constraining spatial predictions within bounded segments of a video frame, or picture. The overall quality of the decoded video signal (following compression and transmission) is thus a trade-off between high compression on the one hand, and error resilience on the other. However, there are potential conflicts between using flexible and error robust segmentation, and an effective signaling of skipped or non-coded regions of a video data frame. Prior art methods handle these conflicts by either restricting segmentation to rigid areas, with a loss of flexibility and efficiency, or by enforcing coding of regions within a segment that in principle do not need to be coded.

Herein, the terms "picture" and "frame" are used interchangeably to refer to a frame of image data in a video sequence.

In order to limit spatial error propagation, different methods or techniques of segmenting a picture are available. Two standard methods are provided by ITU-T Recommendations H.261 and H.262, respectively. In Recommendation H.261, each frame of a video sequence is divided into a number of segments called Groups of Blocks (GOBs). Each GOB contains 33 macroblocks arranged in 3 rows by 11 columns, and each macroblock covers an area of 16×16 pixels. Accordingly, the two picture formats supported by H.261, the Common Intermediate Format (CIF) containing 352×288 pixels, and the Quarter-CIF (QCIF) containing 176×144 pixels, are formed by combining 12 and 3 non-overlapping GOBs, respectively, in order to cover the entire picture.

Within a GOB macroblocks are positioned row by row and left to right, with the first block at the top left corner and the $33^{rd}$ at the bottom right corner. However, only those macroblocks that differ from the previously coded picture (if there was a previously coded picture) need to be coded. Thus, a macroblock address is transmitted before each coded macroblock to signal its position within the GOB. For the first coded macroblock in a GOB, the address is the macroblock position in the GOB. For subsequent macroblocks, the address is the increment of position from the previously coded macroblock. The macroblock addresses are given by the variable-length code words shown in FIG. 1. Macroblocks that are not addressed should be skipped and copied from the previous picture. That is, the video data for a skipped macroblock is the data from the corresponding macroblock of the previous picture. It is to be noted that although there is no restriction on which or how many macroblocks need to be coded, a GOB always refers to 33 macroblocks, whether coded or not. The positions of the beginning and end of each GOB are defined by the H.261 standard and are signaled in the bitstream by a GOB number in each GOB header.

A more flexible picture segmentation technique can be found in the MPEG-1 and MPEG-2 video standards, ISO/IEC 11172-2 and ISO/IEC 13818-2, respectively. The latter is also jointly published by ITU-T as Recommendation H.262. In accordance therewith, a picture is segmented into slices which differ from the above GOBs used in Recommendation H.261. Each slice comprises an arbitrary number of macroblocks, arranged consecutively in a sequence or series, wherein the ordering of macroblocks is referenced to an entire picture starting at the top left corner. Each slice must be at least one macroblock long and may not overlap other slices. MPEG-1 allows slices of arbitrary length, but does not allow gaps between slices. MPEG-2, on the other hand, constrains slices to fit within one row of macroblocks but allows gaps in its general slice structure. Here the occurrence of a gap between slices informs the decoder implicitly that the corresponding macroblocks are skipped, and that the data for these skipped macroblocks should be copied from the pixel values of the corresponding macroblocks of the previous picture.

One important restriction on both MPEG-1 and MPEG-2 slices is that the first and the last macroblocks included in a slice must be coded, i.e., a slice may not start or end with a skipped macroblock. Because of this requirement it is always clear where the previous slice ended when a new slice starts, that is, the previous slice ended right after the last coded macroblock was transmitted. Except for the first and last macroblocks, a slice may contain skipped macroblocks that do not have to be transmitted. Accordingly, the position of each coded macroblock within a slice is signaled in the bitstream. This is done in the same manner as for the GOB arrangement of Recommendation H.261. The relative position of each macroblock is referred to as the macroblock address increment, and is given by the codewords of FIG. 1. In order to allow more than 32 consecutive skipped macroblocks in a slice, a macroblock escape codeword is included as well. One ore more escape codewords can be inserted before the actual macroblock address increment, each indicating an additional increment of 33 macroblocks.

The freedom to use a variable number of macroblocks in a segment makes it possible to keep the segment within a certain bit size. This is very useful when segments are packetized for transmission in an IP (Internet Protocol) network, and particularly important for wireless applications where packet sizes are small. Furthermore, by adjusting the size of segments it is possible to adjust for various transmission environments. In a lossy channel, for instance, compression efficiency can be traded for better video quality using smaller segments. The bit-error rate can thus be used to find an optimal segment size. As for Recommendation H.261 described above, segment boundaries for the GOBs are pre-defined. Hence, the size of a GOB is difficult to control, making these segments very inflexible. To this end slices in MPEG-1 and MPEG-2 are more versatile. However, since slice boundaries are signaled by ensuring that the last macroblock of a slice is always coded, an efficient compression and optimal slice size can be difficult to achieve within these standards. The reason is that one may be forced to code a macroblock, that otherwise could have been skipped, or alternatively deviate from the desired slice size. These disadvantages are further emphasized with reference to FIG. 2.

FIG. 2 shows a row 10 of macroblocks in a QCIF picture, which is otherwise not shown. The macroblocks may be encoded at a first location, transmitted to a decoder at a second location, and decoded thereby to recover the original video data. The original data is typically recovered with a quality degradation depending on how hard the compression is done. FIG. 2 further shows the end portion of a slice 12, including at least coded macroblocks 12a and 12b, the beginning portion of a slice 14, including at least a coded macroblock 14b, and skipped macroblocks 16a–f positioned between the coded macroblocks 12a–c and 14a–b. The skipped macroblocks between coded macroblocks 12c and 14a may create problems in segmenting the macroblocks shown in FIG. 2, if segmentation must be done in accordance with the MPEG-2 standard and if it is desired to place a slice boundary between B and C, in order to form slices 12 and 14 so that each slice could be placed into a separate IP packet of specified maximum size. The location of the slice boundary is even more important if slices 12 and 14 are to precisely fill their IP packets to maximum capacity. If the MPEG-2 standard is applied to the prior art arrangement shown in FIG. 2, three alternatives are possible, each having attendant disadvantages.

In the first alternative, the slice 12 would end at B in FIG. 2, and slice 14 would start at C. The skipped macroblocks 16a–f between B and C would be implicitly considered as skipped by the decoder, since no data would be transmitted for the skipped blocks. However, if the compressed data was transmitted through a lossy channel, such as a wireless communication channel, the IP packet starting at C and thus containing slice 14 could be lost and thus not received at the decoder. In this event, all of the information regarding the skipped macroblocks 16a–f would also be lost. In particular, the decoder would not be able to distinguish skipped macroblocks from lost macroblocks.

In the second alternative, the slice boundary would be located at either B or C, without a gap between slices 12 and 14. Accordingly, if the boundary was placed at B in FIG. 2, the last macroblock of slice 12 would be coded macroblock 12c but the first macroblock of slice 14 would be skipped macroblock 16a. On the other hand, if the boundary was placed at C, the first macroblock of slice 14 would be coded macroblock 14a but the last macroblock of slice 12 would be skipped macroblock 16f. As stated above, neither arrangement would be allowed, since the MPEG-2 standard does not allow skipped macroblocks at the beginning or end of a slice. Therefore, it would be necessary to additionally code one of the skipped macroblocks, either skipped macroblock 16a or 16f. Moreover, the skipped macroblock would have to be coded with zero (absolute) motion vector and no coefficients. In this manner, the skipped macroblock information between B and C could be sent. However, the number of additional bits which would have to be transmitted as a result of coding the skipped macroblock could be quite significant, particularly if the predicted motion vector is large.

In the third alternative, the slice boundary would be placed at either position A or D in FIG. 2. This avoids the respective drawbacks discussed above in connection with the first and second alternatives. However, as stated above, it is desired to send the data of respective slices in IP packets, with one slice per packet and respective packets having a fixed maximum bit size. Clearly, every packet should be filled with as many bits as possible, in order to fully utilize the network capacity. Accordingly, placing the boundary at A could be sub-optimal, if slice 12 thereby became too small to use all the bit capacity of a packet. Placing the boundary at D would not be possible, since slice 12 would become so large that it would exceed the maximum packet size.

SUMMARY OF THE INVENTION

The invention pertains to a method of video compression wherein a frame of video data is segmented into slices. The slices are allowed to contain an arbitrary number of consecutive macroblocks, starting and ending at arbitrary positions within a picture and thereby giving full freedom to start and end slices at any position. Since slices can contain variable numbers of macroblocks, embodiments of the invention can be readily adapted to provide a coding standard for different coding environments.

One embodiment of the invention, directed to a method for compressing a frame of video image data, includes the steps of dividing the frame into a number of blocks comprising coded blocks and skipped blocks, and consecutively grouping the blocks into a sequence of slices. The method further includes the step of inserting a run-length codeword after the final coded block in a slice to indicate the number of skipped blocks which are positioned between the final coded block and the end of the slice. Thus, in one aspect of the invention, non-coded regions of a frame of video data are effectively signaled using run-length coding. Consecutive skipped blocks are grouped together and encoded as a single symbol, referred to herein as a run-length codeword to indicate the number of skipped blocks. By signaling all non-coded regions within a segment of a frame, it is possible to efficiently take advantage of a flexible picture segmentation, and also to effectively conceal damaged picture areas.

BRIEF DESCRIPTION OF THE DRAWINGS

FIG. 3 is a schematic diagram showing a row of macroblocks to be compressed or encoded in accordance with an embodiment of the invention.

FIG. 4 is a schematic diagram showing the macroblock row of FIG. 3 after compression.

FIG. 5 is a table showing run-length codewords for use in an embodiment of the invention, and more particularly shows the first ten variable codewords of an infinite table.

DETAILED DESCRIPTION OF EXEMPLARY EMBODIMENT

Figures 1, 2:
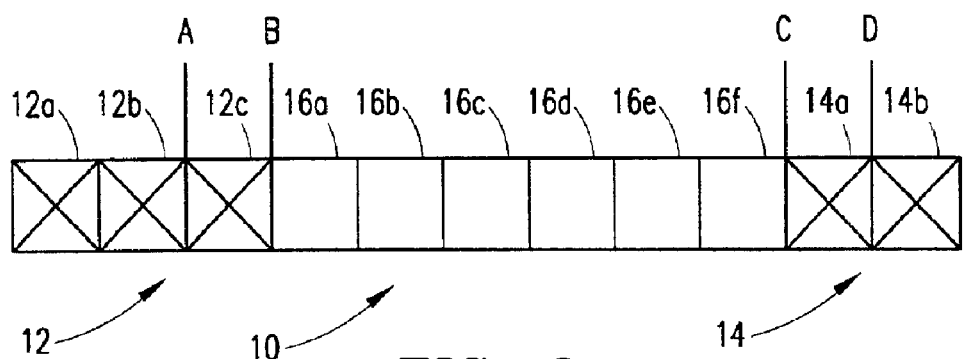
FIG. 1 is a table showing codewords for indicating the address of a macroblock relative to a previous macroblock.
FIG. 2 is a schematic diagram showing a row of macroblocks in a QCIF image for illustrating disadvantages of the prior art.

Referring to FIG. 3, there is shown a row of macroblocks 18 to be compressed in accordance with an embodiment of the invention, which eliminates or substantially reduces problems of the type described above in connection with the prior art. Row 18, comprising macroblocks 18a–18k, is similar to row 10 of FIG. 2 and is associated with motion-compensated digital video compression, whereby respective frames are divided into macroblocks, each macroblock having a luma resolution of 16×16 pixels. Macroblocks 18a–18c and 18j–18k are coded macroblocks encoded in accordance with conventional practice so that motion compensation information is associated therewith, and macroblocks 18d–18i are skipped macroblocks as described above.

In accordance with the invention, the blocks 18a–18k are to be segmented into slices, wherein slices are allowed to contain an arbitrary number of consecutive macroblocks and can start and end at arbitrary positions within the associated frame. Accordingly, full freedom is given to start and end slices at any position. In view of this freedom, the macroblocks shown in FIG. 3 are segmented into a first slice 20 and a second slice 22 by locating a slice boundary at C. It is assumed that this will provide slices 20 and 22 which are both sized to fill corresponding IP packets on an optimal basis, that is, each packet will be filled to maximum capacity. Thus, slice 20 ends with macroblocks 18a–18i and slice 22 begins with macroblocks 18j and 18k. More specifically, slice 20 ends with six skipped macroblocks 18d–18i.

Referring to FIG. 4, there is shown slices 20 and 22 and their respective macroblocks after compression in accordance with the invention. In particular, FIG. 4 shows a run-length codeword 24 included in slice 20, immediately after the last coded macroblock thereof, i.e. after macroblock 18c. Codeword 24 defines the end of slice 20, and has an index indicating the number of non-coded or skipped macroblocks which follow the last coded macroblock in slice 20, prior to the next slice. Codeword 24, which need be no more than a few bits, thus indicates to the decoder that the six skipped macroblocks 18d–18i follow coded macroblock 18c within slice 20. Accordingly information regarding the skipped macroblocks will reach the decoder even if the next slice, slice 22, is lost in transmission. This robustness against error is provided at low overhead cost, since codeword 24 need not be more than a few bits in length. Thus, it is seen that an embodiment of the invention enables the sizes of respective slices to be readily adapted to match the sizes of IP packets. This is especially useful in wireless applications where the packets are relatively small. At the same time, the compression of skipped macroblocks at the end of a slice is very error resilient.

While not shown, each compressed slice or group includes a header or a start code.

In one embodiment of the invention, the run-length codeword 24 could comprise a codeword associated with one of the macroblock addresses shown in FIG. 1. In this embodiment coded macroblocks are addressed using a run-length coding of preceding skipped macroblocks, similar to the addressing of GOBs in H.261, as described above. However, the codeword 24, instead of addressing a coded macroblock, would signal the number of skipped macroblocks between the last coded macroblock and the end of the slice. In order to account for the occurrence of zero skipped blocks, the number selected from FIG. 1 would be equal to the number of skipped blocks plus one. Thus, to indicate the six skipped blocks 18d–18i, the number 7 would be selected from FIG. 1, and the codeword 24 therefore would be 00010. Since FIG. 1 only discloses 33 addresses, an escape codeword could be used to indicate an additional increment of 33 skipped macroblocks, in analogy with the MPEG-1 and MPEG-2 standards described above.

In a second embodiment of the invention, run-length codeword 24 may be generated from an infinite variable-length code. A code of this type would eliminate need for the escape codeword described above. One very useful infinite variable-length code is illustrated in FIG. 5. In a shorthand notation, codewords of the infinite code are generated according to the following pattern: 1; 0×1; 0×0×1; 0×0×0×1; 0×0×0×0×1 . . . , where each x can be either 0 or 1.

FIG. 5 further shows a symbol, referred to as SKIPRUN, which is a single symbol representing the run-length encoding of consecutive skipped blocks. Thus, for the six skipped macroblocks 18d–18i shown in FIG. 3, SKIPRUN would be 6 and run-length codeword 24, from FIG. 5, would be 01011. In this embodiment SKIPRUN is always transmitted at the beginning and at the end of a slice group, and is also inserted between any two adjacent coded macroblocks, to indicate the number of skipped macroblocks therebetween.

In a modification of the invention, the run-length codeword 24 is not used to signal zero skipped macroblocks, in the event there are no skipped macroblocks following the last coded macroblock, before the end of the slice. In this modification, the decoder would simply recognize that the absence of the run-length codeword between slices indicated zero skipped macroblocks therebetween. Accordingly, the coding arrangements shown in FIGS. 1 and 5 could be shifted. Thus, the six skipped macroblocks 18d–18i, in the arrangement of FIG. 1, would be indicated by the codeword 00011. In the arrangement of FIG. 5, the six skipped macroblocks would be represented by the codeword 01001.

Figure 6:
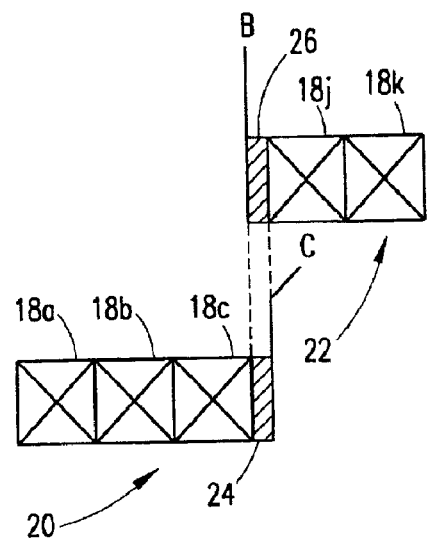
FIG. 6 is a schematic diagram showing a row of macroblocks encoded in accordance with a modification of the invention.

Referring to FIG. 6, there is shown another modification, wherein slices 20 and 22 are overlapped. This is achieved by ending first slice 20 at boundary C, and starting the second slice 22 at boundary B, as respectively shown in FIG. 3. As a result, slice 20 ends with run-length codeword 24 as described above, to indicate the six skipped macroblocks 18d–18i. In addition, slice 22 is provided with a codeword 26 to indicate the six preceding macroblocks 18d–18i. Thus, information regarding skipped macroblocks 18d–18i will be received as long as one of the slices 20 or 22 is received, even if the other is lost. While not shown, slices 20 and 22 could be allowed to overlap other types of macroblocks besides skipped macroblocks.

In a further modification, syntax could be defined to allow slices that only contain non-coded or skipped macroblocks. One such slice could be indicated by a single run-length codeword, covering the entire slice and containing no macroblock data.

Figure 7:
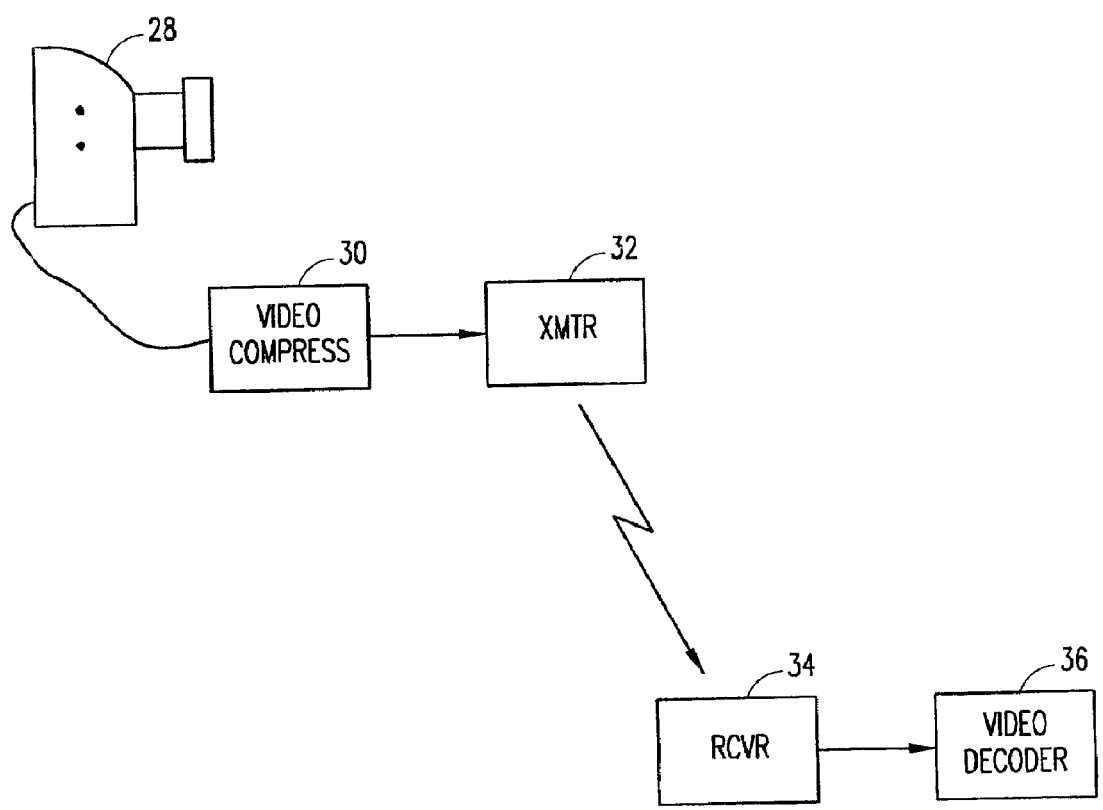
FIG. 7 is a schematic diagram showing a simplified system for compressing, transmitting, and decoding video data in accordance with an embodiment of the invention.

Referring to FIG. 7 there is shown a source 28 of video information such as a video camera. The video information is coupled to a video encoder 30, which compresses successive frames of data in accordance with an embodiment of the invention, as described herein. A bitstream comprising the compressed data is transmitted through a communication channel, which may be a wireless communication channel, from a transmitter 32 to a receiver 34. The received data is applied to a decoder 36 to recover the video information. In its operation, the decoder copies pixels corresponding to skipped macroblocks from a previously received picture.

Obviously, many other modifications and variations of the present invention are possible in light of the above teachings. It is therefore to be understood that within the scope of the disclosed concept, the invention may be practiced otherwise than as has been specifically described.

What is claimed is:

1. A method for compressing a frame of video data comprising the steps of:

dividing said frame into a number of blocks comprising coded blocks and skipped blocks;

consecutively grouping said blocks in a sequence of slices; and inserting a run-length codeword after the final coded block in a particular one of said slices to indicate the number of skipped blocks in said particular slice which are positioned between said final coded block and the end of said particular slice.

2. The method of claim 1 wherein:

the number of consecutive blocks in each of said slices is arbitrary; and said slices are respectively allowed to start and end at arbitrary positions within said frame.

3. The method of claim 1 wherein:

each of said slices contains data disposed for transmission by means of a corresponding data packet, each slice being sized so that its contained data optimally fills its corresponding packet.

4. The method of claim 1 wherein:

one of said slices comprises a first slice having an inserted codeword indicating that a specified number of skipped blocks follow the final codeword of said first slice; and an additional run-length codeword, likewise indicating said specified number of skipped blocks at the end of said first slice, is inserted at the beginning of a second slice which immediately follows said first slice in said sequence.

5. The method of claim 1 wherein:

coded blocks in a slice are addressed by a run-length code indicating he number of skipped blocks which precede respective coded blocks.

6. The method of claim 1 wherein:

each of said slices comprises a start code, a header and data for the coded blocks included therein.

7. The method of claim 1 wherein:

said run-length codeword comprises a small number of digital bits.

8. The method of claim 1 wherein:

consecutive skipped blocks in a slice are encoded together as a single symbol, one of said symbols being placed between each pair of consecutive coded blocks of a slice to indicate the number of skipped blocks therebetween, one of said symbols being additionally placed at the beginning and end, respectively, of each slice.

9. The method of claim 1 wherein:

said run-length codeword is generated from an infinite variable-length coding arrangement.

10. The method of claim 1 wherein:

absence of a run-length codeword at the end of a given slice is employed to indicate that no skipped blocks follow the given slice in said sequence, before the next slice therein.

11. The method of claim 1 wherein:

each of said blocks comprises a macroblock having a luma resolution of 16×16 pixels.

* * * * *

UNITED STATES PATENT AND TRADEMARK OFFICE
CERTIFICATE OF CORRECTION

PATENT NO. : 6,859,500 B2  Page 1 of 1
APPLICATION NO. : 10/066027
DATED : February 22, 2005
INVENTOR(S) : Frojdh et al.

It is certified that error appears in the above-identified patent and that said Letters Patent is hereby corrected as shown below:

In Column 8, Line 8, in Claim 5, delete "he" and insert -- the --, therefor.

Signed and Sealed this

Thirtieth Day of October, 2007

JON W. DUDAS
*Director of the United States Patent and Trademark Office*